(12) United States Patent
Noguchi (10) Patent No.: US 9,039,258 B2
(45) Date of Patent: May 26, 2015

(54) HEADLIGHT SUPPORT STRUCTURE FOR SADDLE TYPE VEHICLE

(71) Applicant: HONDA MOTOR CO., LTD., Tokyo (JP)

(72) Inventor: Yuji Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 123 days.

(21) Appl. No.: 13/947,532

(22) Filed: Jul. 22, 2013

(65) Prior Publication Data

US 2014/0063826 A1    Mar. 6, 2014

(30) Foreign Application Priority Data

Aug. 31, 2012 (JP) ................................. 2012-192201

(51) Int. Cl.
| | |
|---|---|
| *B62J 6/02* | (2006.01) |
| *F21V 21/00* | (2006.01) |
| *B62J 17/02* | (2006.01) |
| *B62K 19/40* | (2006.01) |

(52) U.S. Cl.
CPC .. *F21L 15/10* (2013.01); *B62J 6/02* (2013.01); *B62J 17/02* (2013.01); *B62K 19/40* (2013.01)

(58) Field of Classification Search
CPC ......................................................... B62J 6/02
USPC ....................................................... 362/476
See application file for complete search history.

(56) References Cited

U.S. PATENT DOCUMENTS

| | | | |
|---|---|---|---|
| 2004/0109325 A1* | 6/2004 | Ito et al. ........................ | 362/547 |
| 2006/0062003 A1* | 3/2006 | Lee ............................... | 362/475 |
| 2006/0181891 A1* | 8/2006 | Surawichai et al. .......... | 362/474 |
| 2007/0285935 A1* | 12/2007 | Thiers et al. .................. | 362/476 |
| 2008/0192498 A1* | 8/2008 | Suita ............................. | 362/475 |
| 2008/0239736 A1* | 10/2008 | Aoki ............................. | 362/475 |
| 2010/0232170 A1* | 9/2010 | Tu et al. ........................ | 362/475 |
| 2011/0273896 A1* | 11/2011 | Yun .............................. | 362/476 |

FOREIGN PATENT DOCUMENTS

| | | |
|---|---|---|
| EP | 2 332 812 A1 | 6/2011 |
| JP | 6-219207 A | 8/1994 |

* cited by examiner

*Primary Examiner* — Mary Ellen Bowman
(74) *Attorney, Agent, or Firm* — Birch, Stewart, Kolasch & Birch, LLP (57) ABSTRACT

A saddle type vehicle provided with a headlight stay for permitting a harness laying operation to be easily carried out. A motorcycle is provided with the headlight stay which is supported on a head pipe and extends toward the vehicle front side from the head pipe. A headlight unit is attached to the headlight stay. The headlight stay includes a first stay extending forward from the head pipe, in a side view of the vehicle and a second stay which is supported in a cantilever manner by a front portion of the first stay and extends rearwardly and upwardly. The headlight unit is partly disposed on the front side of the second stay and is disposed so as to overlap with the first stay.

20 Claims, 6 Drawing Sheets

HEADLIGHT SUPPORT STRUCTURE FOR SADDLE TYPE VEHICLE

CROSS-REFERENCE TO RELATED APPLICATIONS

The present application claims priority under 35 USC 119 to Japanese Patent Application No. 2012-192201 filed Aug. 31, 2012 the entire contents of which are hereby incorporated by reference.

BACKGROUND OF THE INVENTION

1. Field of the Invention

The present invention relates to an improvement in a headlight support structure for a saddle type vehicle.

2. Description of Background Art

In saddle type vehicles, a headlight is often attached to a body frame through a headlight stay. See, for example, Japanese Patent Laid-Open No. Hei 6-219207 (FIG. 4).

As shown in FIG. 4 of Japanese Patent Laid-Open No. Hei 6-219207, a frame-like cowling brace (19) (parenthesized numerals are reference signs used in Japanese Patent Laid-Open No. Hei 6-219207, hereinafter) extends forward from the front end of a vehicle body (12). A headlight assembly (17) is attached to the cowling brace (19) through a cowling bracket (31) and a headlight stay (28).

On the cowling brace (19), the headlight assembly (17) is supported together with a front cowling (14) and meters (18).

As shown in FIG. 3 of Japanese Patent Laid-Open No. Hei 6-219207, the cowling brace (19) (hereinafter referred to as headlight stay 19) has a structure wherein a lower arm extends forward from the front end of the vehicle body (12), an upper arm extends forward from the front end of the vehicle body (12) above the lower arm, and left and right vertical arms (20) extending in the height direction and adapted to support the headlight assembly (17) are bridgingly arranged on the lower arm and the upper arm. In other words, the left and right vertical arms (20) are each supported at both ends thereof by the lower arm and the upper arm.

The upper arm extends at the upper side of the headlight assembly (17). Since the upper arm is provided at the upper side of the headlight assembly (17), at the time of laying a harness extending from a headlight or the like, the upper arm may serve as an obstacle, making an operation of laying the harness or the like difficult.

Thus, there is a need for a structure which ensures that the operation of laying harnesses can be carried out easily.

SUMMARY AND OBJECTS OF THE INVENTION

It is an object of an embodiment of the present invention to provide, in a saddle type vehicle having a headlight stay, a headlight stay structure which permits an operation of laying harnesses to be carried out easily.

According to an embodiment of the present invention, there is provided a headlight support structure for a saddle type vehicle that includes a headlight stay supported on a head pipe and extending toward the front side of the vehicle from the head pipe. A headlight unit is attached to the headlight stay and includes a headlight bulb. Electrical equipment is supported on the head pipe. The headlight stay has a first stay extending forward from the head pipe and second stays each supported in a cantilever manner by a front portion of the first stay and extending rearwardly and upwardly, in a side view of the vehicle. The headlight unit is at least partly disposed on the front side of the second stays and is disposed at such a position so as to overlap with the first stay, in a side view of the vehicle. A harness extending from the electrical equipment is disposed on the upper side of the first stay and rearwardly of the second stays, in a side view of the vehicle.

According to an embodiment of the present invention, in the headlight support structure the first stay is extended forward at a vehicle-width-directional center of the head pipe. The second stays extend in a vehicle-width-direction leftward and rightward from a head portion of the first stay and then extend rearwardly and upwardly. The headlight unit is attached to the headlight stay so that the headlight bulb is located between the left and right second stays.

According to an embodiment of the present invention, in the headlight support structure the second stays are curved, extend rearwardly and upwardly along an external shape of the headlight unit below the headlight bulb, and extend substantially vertically above the headlight bulb.

According to an embodiment of the present invention, in the headlight support structure a third stay is bridgingly arranged between an upper portion of the second stay on the left side and an upper portion of the second stay on the right side, the headlight unit is attached to the headlight stay through the third stay, and a meter unit is supported on the third stay.

According to an embodiment of the present invention, in the headlight support structure the electrical equipment is a key cylinder, and the key cylinder is disposed in the vehicle-width-directional center and is disposed rearwardly of the third stay.

According to an embodiment of the present invention, in the headlight support structure a left visor stay is attached to an upper portion of the left second stay, while a right visor stay is attached to an upper portion of the right second stay. A visor for restraining direct impingement of sunlight on the meter unit is attached to the left and right visor stays. A left fourth stay is bridgingly arranged between the third stay and the left visor stay, while a right fourth stay is bridgingly arranged between the third stay and the right visor stay. The meter unit is supported on the third stay through the left and right fourth stays.

According to an embodiment of the present invention, the first stay extends forward from the head pipe, and the second stays each extend upwardly from a front portion of the first stay. In other words, the head light stay is roughly L-shaped in side view of the vehicle.

If the upper ends of the second stays are connected to the head pipe through upper stays, the assembly would be roughly angular U-shaped in side view of the vehicle. In this case, the upper stays may serve as an obstacle, making it difficult to carry out an operation of laying the harness extending from the electrical equipment or the like.

According to an embodiment of the present invention, on the other hand, such upper stays are omitted, so that an operation of laying the harness extending from the electrical equipment or the like can be carried out easily.

In addition, the headlight unit is disposed at such a position in the vehicle longitudinal direction as to overlap with the first stay in a side view of the vehicle. In other words, the headlight unit can be moved toward the vehicle rear side, as compared with the case where the first stay is disposed rearwardly of the headlight unit. Where the headlight unit can be moved toward the vehicle rear side, the distance from the head pipe to the front end of the headlight unit is shortened, so that the length in the longitudinal direction of the vehicle front portion can be shortened. As a result, the vehicle front portion can be reduced in size.

According to an embodiment of the present invention, the headlight bulb is disposed between the left and right second stays. This ensures that maintenance of the headlight bulb can be easily carried out by putting a hand into the space between the left and right second stays.

According to an embodiment of the present invention, the second stays are disposed along the external shape of the headlight unit. Since the headlight unit is disposed along the second stays, the headlight unit can be disposed close to the head pipe. Further, the headlight unit can be moved toward the rear side.

According to an embodiment of the present invention, the third stay is bridgingly arranged between the left second stay upper portion and the right second stay upper portion. The third stay functions as a reinforcement member for the second stays. More specifically, the third stay restrains the second stays from being twisted. As a result, the second stays are enhanced in rigidity.

In addition, the meter unit is supported on the third stay. Since the third stay is attached to the second stay upper portions, it is provided at a high position. Accordingly, the meter unit is supported at a position near the rider's eyes, whereby good visual checking properties can be assured.

According to an embodiment of the present invention, the key cylinder is disposed rearwardly of the third stay. Therefore, there is no fear that the third stay might obstruct key operations, so that favorable key operations are promised.

According to an embodiment of the present invention, the left fourth stay is bridgingly arranged between the left visor stay and the third stay, whereas the right fourth stay is bridgingly arranged between the right visor stay and the third stay. With the left fourth stay bridgingly arranged, the joint strength between the left visor stay and the third stay is enhanced. With the right fourth stay bridgingly arranged, the joint strength between the right visor stay and the third stay is enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described referring to the drawings.

Figure 1:
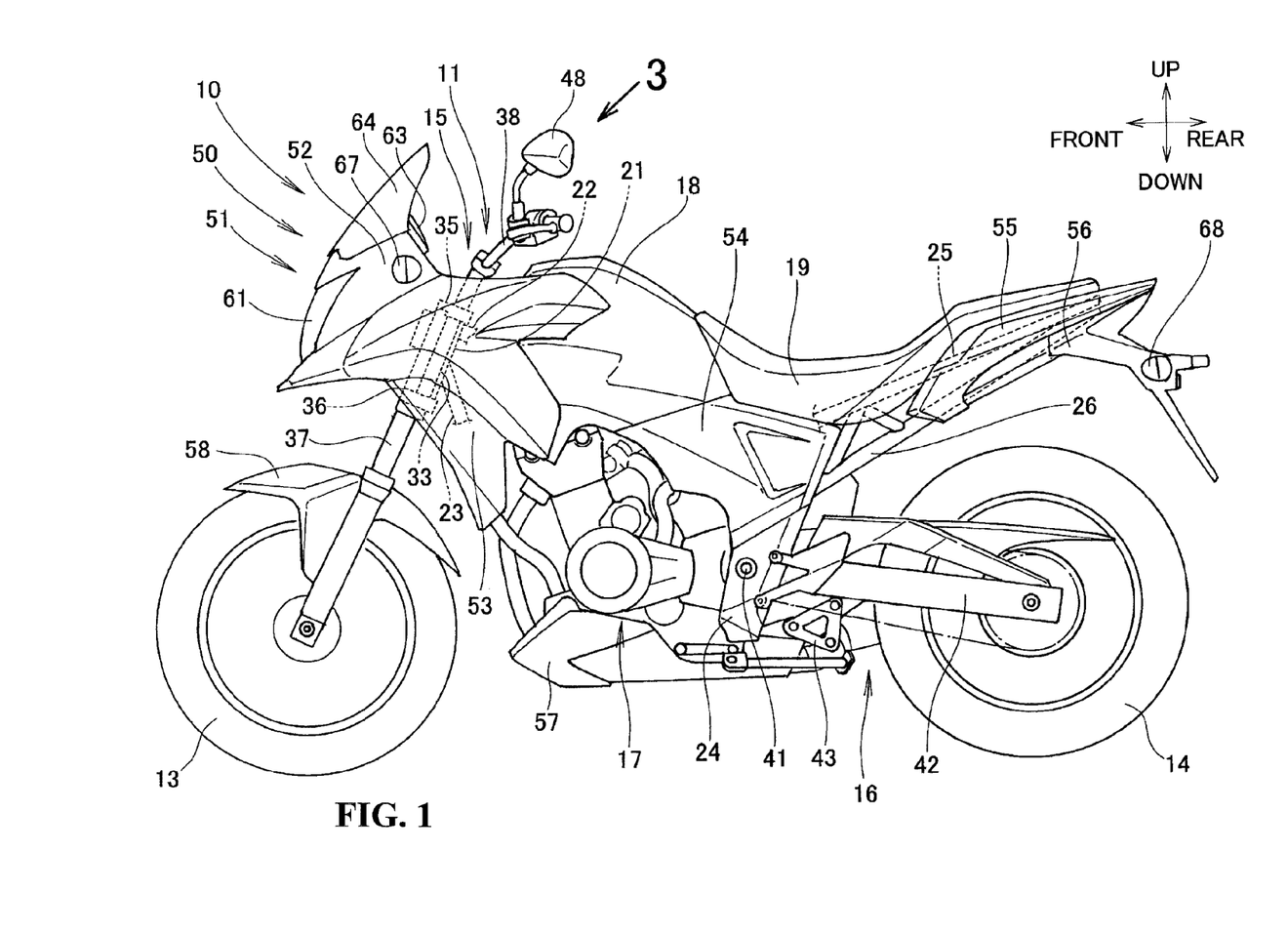
FIG. 1 is a left side view of a motorcycle pertaining to the present invention.

As shown in FIG. 1, a motorcycle 10 is a saddle type vehicle including, as main components a body frame 11; a front wheel steering unit 15 provided at the front end of the body frame 11 to support a front wheel 13; a rear wheel suspension unit 16 extending toward the vehicle rear side from a lower part of a vehicle longitudinally intermediate portion of the body frame 11 to support a rear wheel 14; an engine 17 suspended on the body frame 11 between the front wheel steering unit 15 and the rear wheel suspension unit 16. A fuel tank 18 is attached to the body frame 11 on the upper side of the engine 17 with a seat 19 which is provided rearwardly of the fuel tank 18 in a continuous manner and on which a rider is seated.

The body frame 11 includes a head pipe 21 supporting the front wheel steering unit 15 in a steerable manner; a main frame 22 extending rearwardly from the head pipe 21 and a down frame 23 extending rearwardly and downwardly from the head pipe 21 on the lower side of the main frame 22. Pivot plates 24 extend downwardly from the rear end of the main frame 22 with a seat rail 25 and a support frame 26 which obliquely extend rearwardly and upwardly from the rear end of the main frame 22.

The front wheel steering unit 15 includes, as main components a steering shaft 33 turnably fitted in the head pipe 21; a top bridge 35 and a bottom bridge 36 which are attached respectively to the upper end and the lower end of the steering shaft 33. A handlebar 38 is attached to an upper surface of the top bridge 35 and operated by the rider for steering. A front fork 37 is attached to the top bridge 35 and the bottom bridge 36, extending downwardly and supporting the front wheel 13.

The rear suspension unit 16 includes, as main components a pivot 41 attached to the pivot plates 24 so as to extend in the vehicle width direction; a swing arm 42 extending rearwardly from the pivot 41 and rotatably supporting the rear wheel 14 by the rear end thereof; a link mechanism 43 attached to the swing arm 42; and a shock absorber unit (not shown) bridgingly arranged between the link mechanism 43 and the body frame 11. In the drawings, the terms "upper (upward)," "lower (downward)," "front (forward)," "rear (rearward)," "left (leftward)," and "right (rightward)" indicate respective sides or directions as viewed from the driver riding on the motorcycle.

A vehicle body 50 including the body frame 11 is covered with a body cover 51. The body cover 51 includes a headlight cowl 52 disposed at a front end portion of the vehicle so as to surround the periphery of a headlight unit 61; a front cowl 53 extending toward the vehicle rear side in connection with the headlight cowl 52; a middle cowl 54 extending toward the vehicle rear side in connection with the rear end of the front cowl 53 and a rear cowl 55 covering the seat rail 25 on lateral sides of the latter on the vehicle rear side of the middle cowl 54 and on the upper side of the rear wheel 14. A rear fender 56 is attached to the seat rail 25 on the vehicle-width-directionally inner side of the rear cowl 55 with a lower cowl 57 covering the lower side of the engine 17. A front fender 58 for avoiding mud splashed by the front wheel 13 is attached to the front fork 37 on the upper side of the front wheel 13. Front turn signal lamps 67 are attached to the headlight cowl 52, and rear turn signal lamps 68 are attached to the rear fender 56.

A meter unit 63 is disposed on the vehicle front side of the handlebar 38 and on the vehicle rear side of the headlight cowl 52. A visor 64 for preventing direct impingement of sunlight on the meter unit 63 and for preventing airflow (induced by the operation of the vehicle) from reaching the rider. Rear view mirrors 48 are attached respectively to both ends of the handlebar 38.

Now, a headlight support structure and a structure in the surroundings thereof will be described below.

Figure 2:
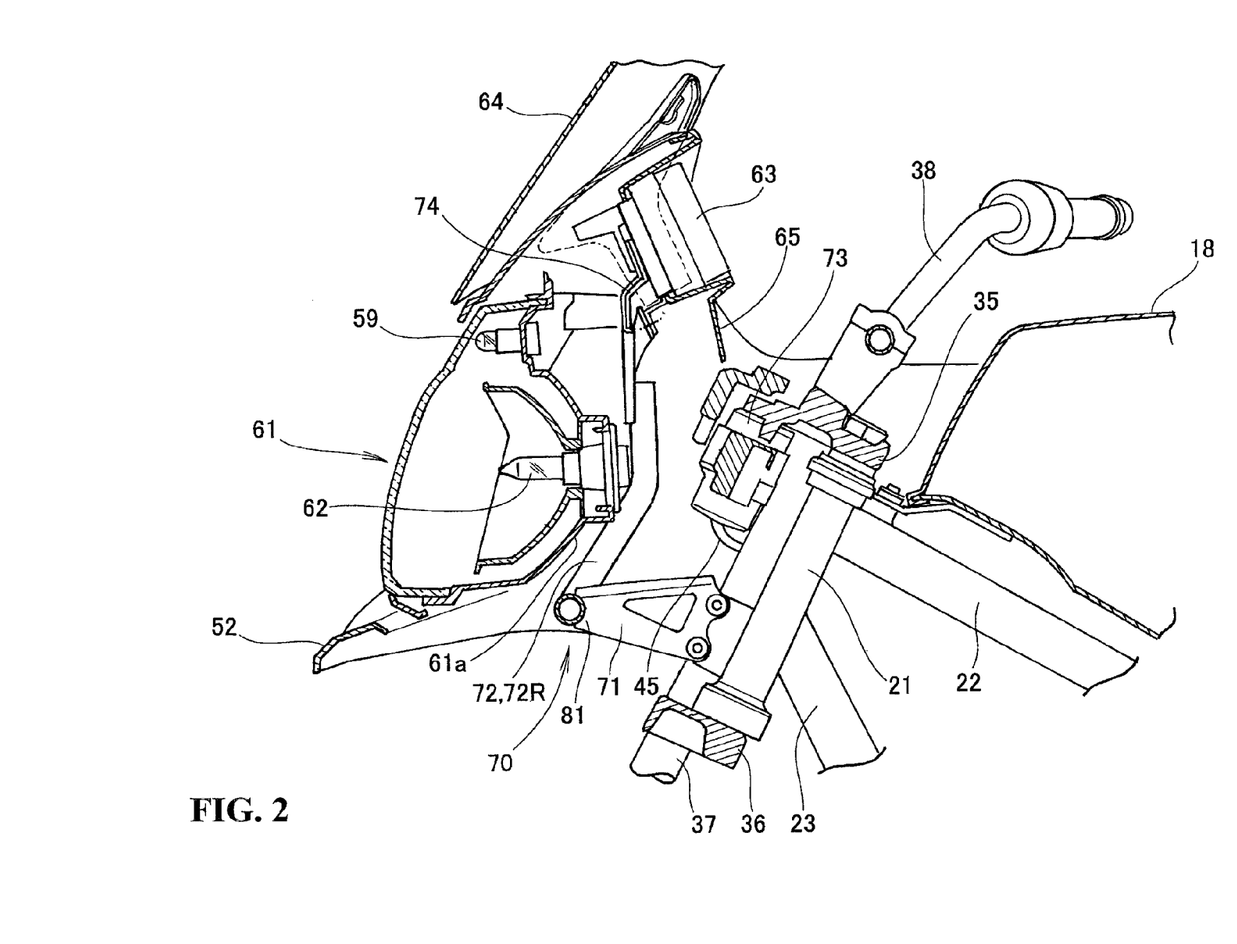
FIG. 2 is a sectional view of a major part of the motorcycle pertaining to the present invention.

As shown in FIG. 2, a headlight stay 70 extends from the head pipe 21 toward the vehicle front side, and the headlight unit 61 is disposed on the front side of the headlight stay 70. The headlight unit 61 includes a headlight bulb 62, and a position lamp 59 provided on the upper side of the headlight bulb 62.

The headlight stay 70 is supported on the head pipe 21. The meter unit 63 is also supported on the headlight stay 70. A key cylinder 73 constituting an electrical equipment is disposed between the meter unit 63 and the head pipe 21. The key cylinder 73 is supported on the head pipe 21.

The headlight stay 70 has a first stay 71 extending forward from the head pipe 21, in side view of the vehicle, and second stays 72 that are each supported on a front portion of the first stay 71 in a cantilever manner and extend rearwardly and upwardly. The second stays 72 are curved. The second stays 72 extend rearwardly and upwardly along an external shape 61a of the headlight unit 61 below the headlight bulb 62, and extend substantially vertically above the headlight bulb 62.

The headlight unit 61 is partly disposed on the front side of the second stays 72, and is so located as to overlap the first stay 71 in side view of the vehicle. A harness 45 extending from the electrical equipment (key cylinder 73) is disposed on the upper side of the first stay 71 and on the rear side of the second stays 72. In addition, the electrical equipment may be electrical equipment other than the key cylinder.

Now, configurations of the meter unit and the surroundings thereof will be described below.

Figure 3:
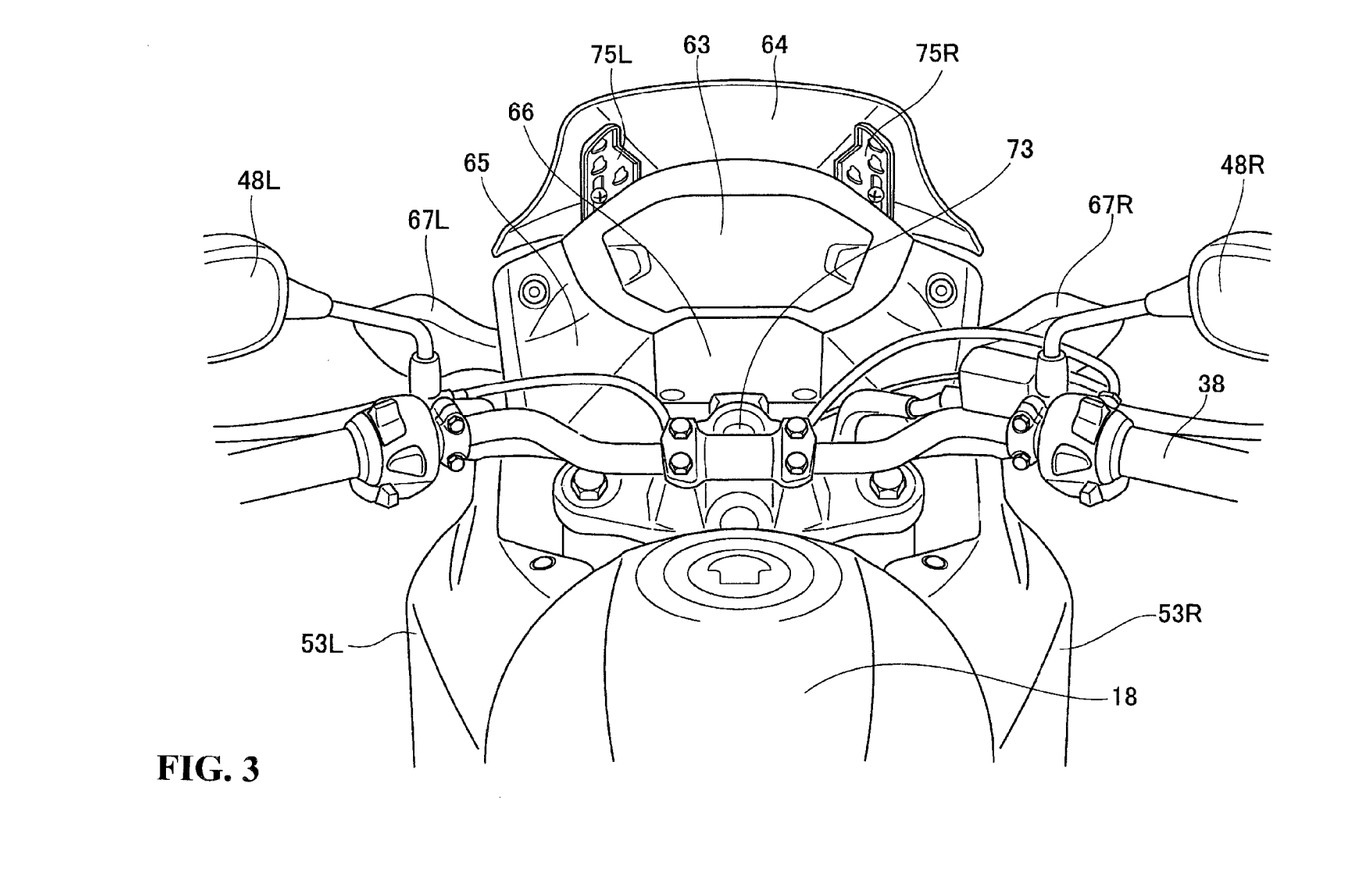
FIG. 3 is a view taken along arrow 3 of FIG. 1.

As shown in FIG. 3, the key cylinder 73 is disposed in a vehicle-width-directional center on the front side of the handlebar 38, the meter unit 63 is disposed in a vehicle-width-directional central position on the front side of the key cylinder 73, and a meter cowl 65 is disposed in such a manner as to cover the periphery of the meter unit 63. A headlight replacement lid 66 opened and closed at the time of replacing the headlight bulb (FIG. 2, reference sign 62) is detachably attached between the key cylinder 73 and the meter unit 63. The headlight replacement lid 66 is a component of the meter cowl 65.

Figure 4:
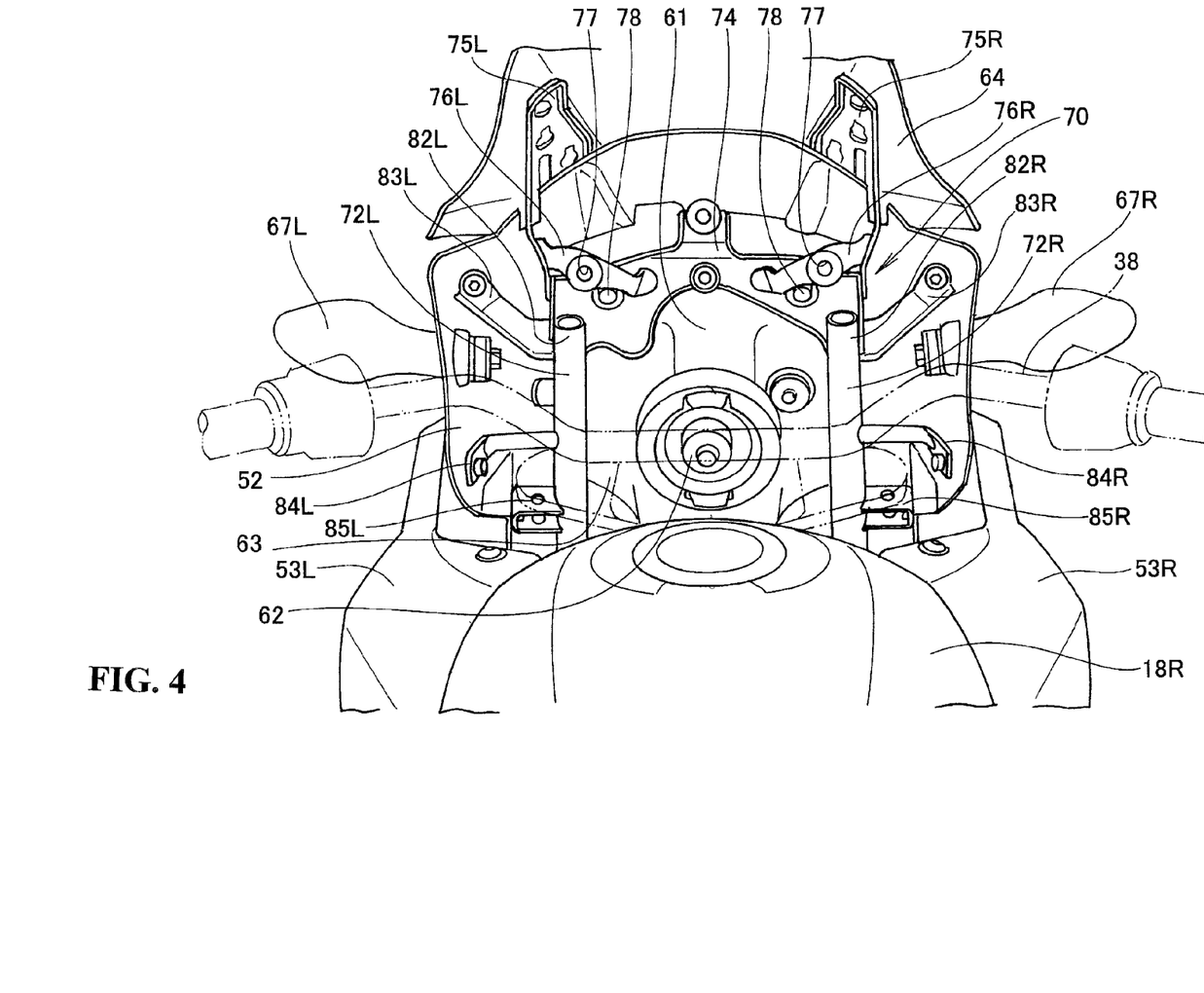
FIG. 4 is a view of a state where a meter unit and a meter cowl have been removed from the state shown in FIG. 3.

Now, a configuration in a state where the meter unit and the meter cowl have been removed will be described below. As shown in FIG. 4, the left and right second stays 72L and 72R of the headlight stay 70 each extend upwardly. A third stay 74 is bridgingly arranged between left and right second stay upper portions 82L and 82R. The headlight unit 61 is attached to the third stay 74 by bolts 78, 78. In other words, the headlight unit 61 is attached to the headlight stay 70 through the third stay 74.

The headlight unit 61 is attached to the headlight stay 70 in such a manner that the headlight bulb 62 is located between the left and right second stays 72L and 72R. The headlight bulb 62 is disposed between the left and right second stays 72L and 72R. Maintenance of the headlight bulb 62 can be easily carried out by opening the above-mentioned headlight replacement lid (FIG. 3, reference sign 66) and putting a hand into the space between the left and right second stays 72L and 72R.

The third stay 74 is bridgingly arranged between the left and right second stay upper portions 82L and 82R. The lower ends of left and right visor stays 75L and 75R are attached respectively to the left and right upper ends of the third stay 74. The left and right visor stays 75L and 75R extend upwardly.

In this embodiment, the left and right visor stays 75L and 75R are attached to the third stay 74. However, other configurations may also be adopted wherein the left and right second stays 72L and 72R extend a little upwardly, whereby the left visor stay 75L is attached to an upper portion of the left one of the second stays 72L and 72R, whereas the right visor stay 75R is attached to an upper portion of the right one of the second stays 72L and 72R. In other words, the left and right visor stays 75L and 75R are attached to the left and right second stay upper portions 82L and 82R, respectively, through the third stay 74.

The visor 64 for preventing direct impingement of sunlight on the meter unit (FIG. 3, reference sign 63) is attached to the left and right visor stays 75L and 75R. A left fourth stay 76L is bridgingly arranged between the third stay 74 and the left visor stay 75L, while a right fourth stay 76R is bridgingly arranged between the third stay 74 and the right visor stay 75R.

The left and right fourth stays 76L and 76R are respectively formed therein with meter attaching holes 77, 77 for attaching the meter unit 63. Thus, the meter unit 63 is supported on the third stay 74 through the left and right fourth stays 76L and 76R.

In FIG. 3, the key cylinder 73 is disposed in a vehicle-width-directional center. In addition, as shown in FIG. 2, the key cylinder 73 is disposed rearwardly of the third stay 74. Since the key cylinder 73 is disposed rearwardly of the third stay 74, there is no fear that the third stay 74 might obstruct key operations, so that favorable key operations are promised.

Now, a detailed structure of the headlight stay will be described.

Figure 5:
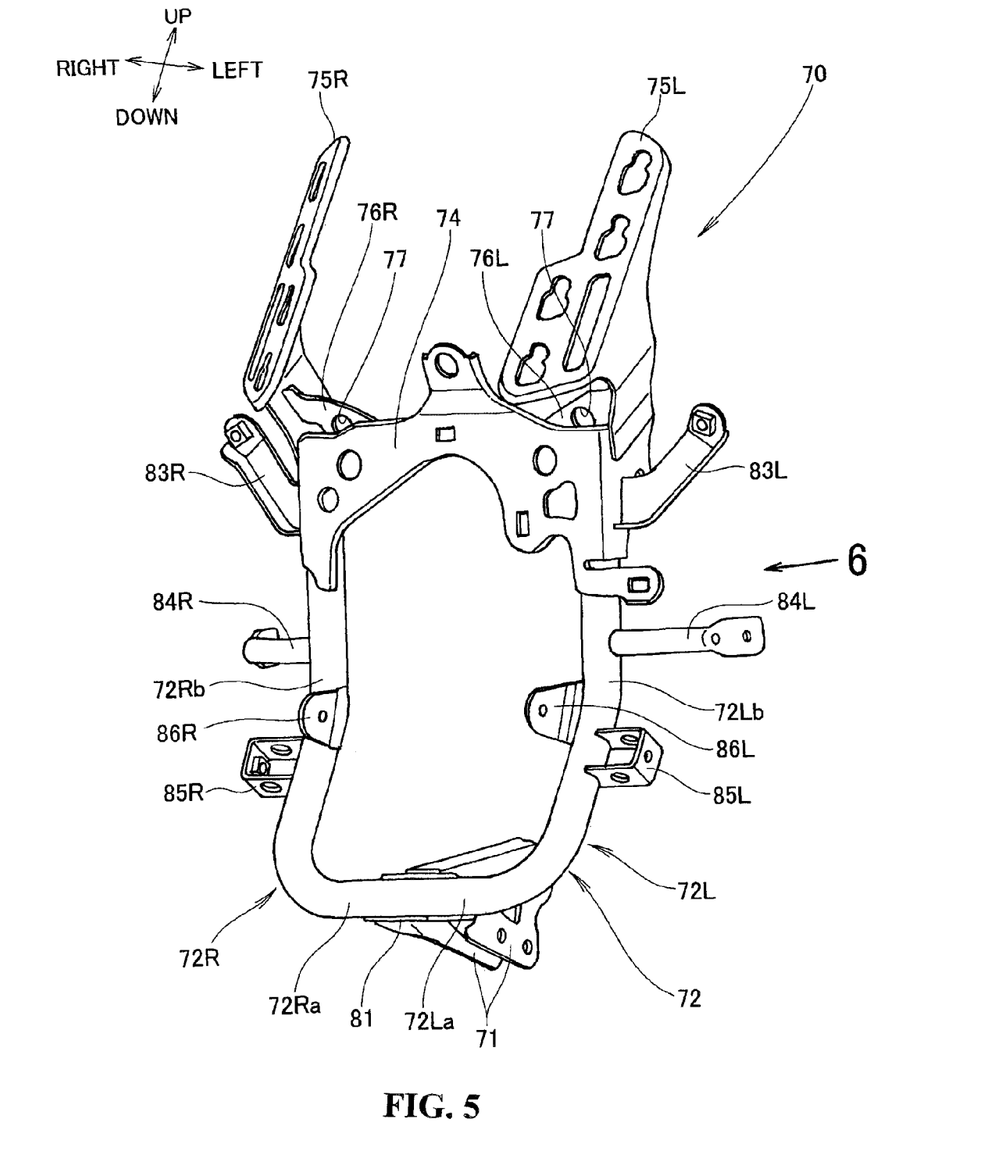
FIG. 5 is a perspective view of a headlight stay.

As shown in FIG. 5, the headlight stay 70 includes, as main components the first stay 71 extending forward at a vehicle-width-directional center of the head pipe (FIG. 2, reference sign 21); the second stay 72 extending from a front portion 81 of the first stay leftward and rightward in the vehicle width direction and then extending rearwardly and upwardly; the third stay 74 extending in the vehicle width direction at an upper portion 82 of the second stay 72; and the visor stays 75L and 75R extending upward from both upper ends of the third stay 74.

The second stay 72 includes the left second stay 72L and the right second stay 72R. The left second stay 72L includes a cross stay part 72La extending leftward from the vehicle-width-directional center, and a left second stay part 72Lb turned from the cross stay part 72La rearwardly and upwardly and extending upwardly. Similarly, the right second stay 72R includes a cross stay part 72Ra extending to the right from the vehicle-width-directional center, and a right second stay part 72Rb turned from the cross stay part 72Ra rearwardly and upwardly and extending upwardly. The third stay 74 is bridgingly arranged between the left second stay part 72Lb and the right second stay part 72Rb.

In this embodiment, the second stay 72 is formed by bending a single pipe member. However, other configurations may be adopted in which the left second stay 72L and the right second stay 72R are provided as separate members and are joined to each other to form the second stay 72.

Figure 6:
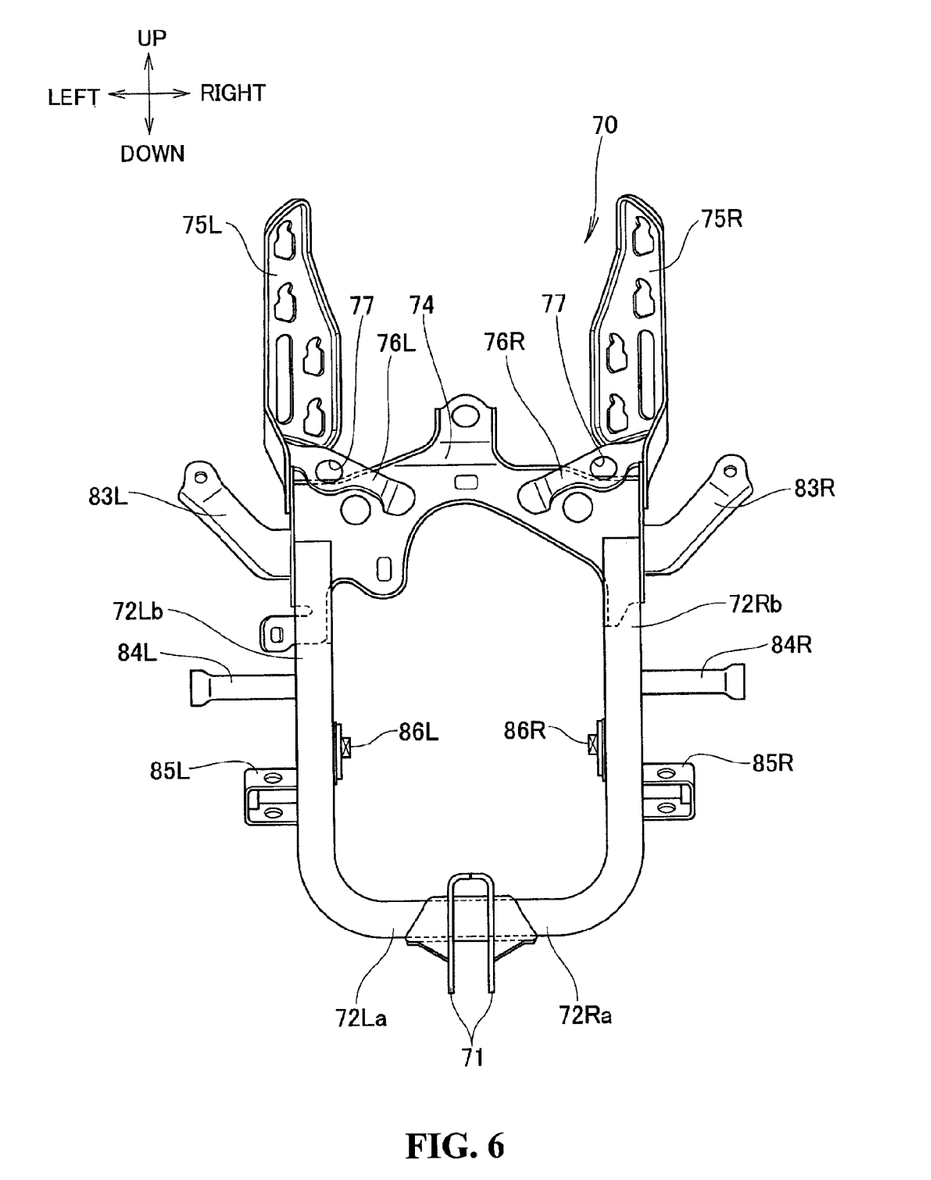
FIG. 6 is a view taken along arrow 6 of FIG. 5 and is a back elevation of the headlight stay.

As shown in FIG. 6, the left and right headlight cowl upper portion stays 83L and 83R for supporting an upper portion of the headlight cowl (FIG. 4, reference sign 52) are secured respectively to the left and right visor stays 75L and 75R. Left and right headlight cowl rear portion stays 84L and 84R for supporting a rear portion of the headlight cowl 52 are secured respectively to the left and right second stays 72L and 72R. In addition, left and right headlight cowl lower portion stays 85L and 85R for supporting a lower portion of the headlight cowl 52 are secured respectively to the left and right second stays 72L and 72R. Left and right headlight sub-stays 86L and 86R to which lower portions of the headlight unit 61 are respectively attached are secured to lower portions of the left and right second stays 72L and 72R.

The operation of the headlight support structure for the saddle type vehicle (motorcycle) as above-described will be described below.

In FIGS. 2 and 5, the first stay 71 extends forward from the head pipe 21, and the second stays 72L and 72R extend upwardly from the first stay front portion 81. In other words, the headlight stay 70 is roughly L-shaped in side view of the vehicle.

If the upper ends of the second stays 72L and 72R are connected to the head pipe 21 by upper stays, the assembly would be roughly angular U-shaped in side view of the vehicle. In this case, the upper stays may serve as an obstacle, making it difficult to carry out an operation of laying the harnesses extending from the electrical equipment or the like.

In the present invention, on the other hand, such upper stays are omitted, so that an operation of laying the harness 45 extending from the electrical equipment or the like can be carried out easily.

In addition, the headlight unit 61 is disposed at such a position in the vehicle longitudinal direction as to overlap with the first stay 71 in a side view of the vehicle. In other words, the headlight unit 61 can be moved toward the vehicle rear side, as compared with the case where the first stay 71 is disposed rearwardly of the headlight unit 61. Where the headlight unit 61 can be moved toward the vehicle rear side, the distance from the head pipe 21 to the front end of the headlight unit 61 is shortened, so that the length in the longitudinal direction of the vehicle front portion can be shortened. As a result, the vehicle front portion can be reduced in size.

The second stays 72L and 72R are disposed along the external shape of the headlight unit 61 in a side view of the vehicle. Since the headlight unit 61 is disposed along the second stays 72L and 72R, the headlight unit 61 can be disposed close to the head pipe 21. Further, the headlight unit 61 can be moved toward the rear side.

In FIG. 4, the third stay 74 is bridgingly arranged between the left second stay upper portion 82L and the right second stay upper portion 82R. The third stay 74 functions as a reinforcement member for the second stays 72L and 72R. More specifically, the third stay 74 restrains the left and right second stays 72L and 72R from being twisted. Consequently, the second stays 72L and 72R are enhanced in rigidity.

In addition, the meter unit 63 is supported on the third stay 74. Since the third stay 74 is attached to the second stay upper portions 82L and 82R, it is provided at a high position. Accordingly, the meter unit 63 is supported at a position near the rider's eyes, whereby good visual checking properties can be assured.

The left fourth stay 76L is bridgingly arranged between the left visor stay 75L and the third stay 74, whereas the right fourth stay 76R is bridgingly arranged between the right visor stay 75R and the third stay 74. With the left fourth stay 76L bridgingly arranged, the joint strength between the left visor stay 75L and the left third stay 74 is enhanced. With the right fourth stay 76R bridgingly arranged, the joint strength between the right visor stay 75R and the right third stay 74 is enhanced.

While the present invention is applied to the motorcycle in this embodiment, the invention is applicable also to saddle type three-wheel vehicles, and may be applied to common saddle type vehicles.

The present invention is suitable for application to motorcycles provided with a headlight stay.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A headlight support structure for a saddle vehicle, comprising:
    a headlight stay supported on a head pipe and extending toward the front side of the vehicle from the head pipe;
    a headlight unit attached to the headlight stay and having a headlight bulb;
    electrical equipment supported on the head pipe;
    wherein the headlight stay has a first stay extending forward from the head pipe, and second stays each supported in a cantilever manner by a front portion of the first stay and extending rearwardly and upwardly, in a side view of the vehicle;
    the headlight unit is at least partly disposed on the front side of the second stays and is disposed at such a position so as to overlap with the first stay, in a side view of the vehicle; and
    a harness extending from the electrical equipment, said harness being disposed on the upper side of the first stay and rearwardly of the second stays, in a side view of the vehicle.

2. The headlight support structure for the saddle vehicle according to claim 1,
    wherein the first stay extends forward at a vehicle-width-directional center of the head pipe;
    the second stays extend in a vehicle-width-directionally leftward and rightward from a head portion of the first stay and then extend rearwardly and upwardly; and
    the headlight unit is attached to the headlight stay so that the headlight bulb is located between the left and right second stays.

3. The headlight support structure for the saddle vehicle according to claim 1, wherein the second stays are curved, extend rearwardly and upwardly along an external shape of the headlight unit below the headlight bulb, and extend substantially vertically above the headlight bulb.

4. The headlight support structure for the saddle vehicle according to claim 2, wherein the second stays are curved, extend rearwardly and upwardly along an external shape of the headlight unit below the headlight bulb, and extend substantially vertically above the headlight bulb.

5. The headlight support structure for the saddle vehicle according to claim 1,
    wherein a third stay is bridgingly arranged between an upper portion of the second stay on the left side and an upper portion of the second stay on the right side;
    the headlight unit is attached to the headlight stay through the third stay; and
    a meter unit is supported on the third stay.

6. The headlight support structure for the saddle vehicle according to claim 2,
    wherein a third stay is bridgingly arranged between an upper portion of the second stay on the left side and an upper portion of the second stay on the right side;
    the headlight unit is attached to the headlight stay through the third stay; and
    a meter unit is supported on the third stay.

7. The headlight support structure for the saddle vehicle according to claim 3, wherein a third stay is bridgingly arranged between an upper portion of the second stay on the left side and an upper portion of the second stay on the right side;

the headlight unit is attached to the headlight stay through the third stay; and a meter unit is supported on the third stay.

8. The headlight support structure for the saddle vehicle according to claim 5, wherein the electrical equipment is a key cylinder; and the key cylinder is disposed in the vehicle-width-directional center and is disposed rearwardly of the third stay.

9. The headlight support structure for the saddle vehicle according to claim 4, wherein a left visor stay is attached to an upper portion of the left second stay, while a right visor stay is attached to an upper portion of the right second stay;

a visor for restraining direct impingement of sunlight on the meter unit is attached to the left and right visor stays;

a left fourth stay is bridgingly arranged between the third stay and the left visor stay, while a right fourth stay is bridgingly arranged between the third stay and the right visor stay; and the meter unit is supported on the third stay through the left and right fourth stays.

10. The headlight support structure for the saddle vehicle according to claim 5, wherein a left visor stay is attached to an upper portion of the left second stay, while a right visor stay is attached to an upper portion of the right second stay;

a visor for restraining direct impingement of sunlight on the meter unit is attached to the left and right visor stays;

a left fourth stay is bridgingly arranged between the third stay and the left visor stay, while a right fourth stay is bridgingly arranged between the third stay and the right visor stay; and the meter unit is supported on the third stay through the left and right fourth stays.

11. A headlight support structure for a saddle vehicle, comprising:

a headlight stay including a first stay extending forward from a head pipe, and second stays each supported in a cantilever manner by a front portion of the first stay and extending rearwardly and upwardly, in a side view of the vehicle;

a headlight unit at least partly disposed on the front side of the second stays and disposed at such a position so as to overlap with the first stay, in a side view of the vehicle;

electrical equipment supported on the head pipe; and a harness extending from the electrical equipment, said harness being disposed on the upper side of the first stay and rearwardly of the second stays, in a side view of the vehicle.

12. The headlight support structure for the saddle vehicle according to claim 11, wherein the first stay extends forward at a vehicle-width-directional center of the head pipe;

the second stays extend in a vehicle-width-directionally leftward and rightward from a head portion of the first stay and then extend rearwardly and upwardly; and the headlight unit is attached to the headlight stay so that a headlight bulb is located between the left and right second stays.

13. The headlight support structure for the saddle vehicle according to claim 11, wherein the second stays are curved, extend rearwardly and upwardly along an external shape of the headlight unit below the headlight bulb, and extend substantially vertically above a headlight bulb.

14. The headlight support structure for the saddle vehicle according to claim 12, wherein the second stays are curved, extend rearwardly and upwardly along an external shape of the headlight unit below the headlight bulb, and extend substantially vertically above the headlight bulb.

15. The headlight support structure for the saddle vehicle according to claim 11, wherein a third stay is bridgingly arranged between an upper portion of the second stay on the left side and an upper portion of the second stay on the right side;

the headlight unit is attached to the headlight stay through the third stay; and a meter unit is supported on the third stay.

16. The headlight support structure for the saddle vehicle according to claim 12, wherein a third stay is bridgingly arranged between an upper portion of the second stay on the left side and an upper portion of the second stay on the right side;

the headlight unit is attached to the headlight stay through the third stay; and a meter unit is supported on the third stay.

17. The headlight support structure for the saddle vehicle according to claim 13, wherein a third stay is bridgingly arranged between an upper portion of the second stay on the left side and an upper portion of the second stay on the right side;

the headlight unit is attached to the headlight stay through the third stay; and a meter unit is supported on the third stay.

18. The headlight support structure for the saddle vehicle according to claim 15, wherein the electrical equipment is a key cylinder; and the key cylinder is disposed in the vehicle-width-directional center and is disposed rearwardly of the third stay.

19. The headlight support structure for the saddle vehicle according to claim 14, wherein a left visor stay is attached to an upper portion of the left second stay, while a right visor stay is attached to an upper portion of the right second stay;

a visor for restraining direct impingement of sunlight on the meter unit is attached to the left and right visor stays;

a left fourth stay is bridgingly arranged between the third stay and the left visor stay, while a right fourth stay is bridgingly arranged between the third stay and the right visor stay; and the meter unit is supported on the third stay through the left and right fourth stays.

20. The headlight support structure for the saddle vehicle according to claim 15, wherein a left visor stay is attached to an upper portion of the left second stay, while a right visor stay is attached to an upper portion of the right second stay;

a visor for restraining direct impingement of sunlight on the meter unit is attached to the left and right visor stays;

a left fourth stay is bridgingly arranged between the third stay and the left visor stay, while a right fourth stay is bridgingly arranged between the third stay and the right visor stay; and the meter unit is supported on the third stay through the left and right fourth stays.

* * * * *